(12) United States Patent
Govari

(10) Patent No.: US 12,502,231 B2
(45) Date of Patent: Dec. 23, 2025

(54) CATHETER POSITION TRACKING AND REPRESENTATION USING A DYNAMIC SPRING MODEL AND MOTION EQUATION

(71) Applicant: Biosense Webster (Israel) Ltd., Yokneam (IL)

(72) Inventor: Assaf Govari, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 0 days.

(21) Appl. No.: 18/776,706

(22) Filed: Jul. 18, 2024

(65) Prior Publication Data

US 2024/0374320 A1 Nov. 14, 2024

Related U.S. Application Data

(63) Continuation of application No. 16/228,385, filed on Dec. 20, 2018, now abandoned.

(51) Int. Cl.
*A61B 34/20* (2016.01)
*A61B 5/00* (2006.01)
(Continued)

(52) U.S. Cl.
CPC .............. *A61B 34/20* (2016.02); *A61B 5/062* (2013.01); *A61B 5/064* (2013.01); *A61B 5/066* (2013.01);
(Continued)

(58) Field of Classification Search
CPC ......... A61B 34/20; A61B 5/062; A61B 5/064; A61B 5/066; A61B 5/6852; A61B 5/6869; A61B 6/12; A61B 6/486; A61B 6/503; A61B 8/0883; A61B 18/1492; A61B 2034/2051; A61B 2034/2061;
(Continued)

(56) References Cited

U.S. PATENT DOCUMENTS

| | | | |
|---|---|---|---|
| 5,391,199 A | 2/1995 | Ben-Haim | |
| 6,239,724 B1 | 5/2001 | Doron et al. | |

(Continued)

FOREIGN PATENT DOCUMENTS

| | | |
|---|---|---|
| CN | 102663158 B | 5/2014 |
| CN | 104657590 A | 5/2015 |

(Continued)

OTHER PUBLICATIONS

Lv et al (Physically based real-time interactive assembly simulation of cable harness, Journal of Manufacturing Systems 43 (2017) 385-399).*

(Continued)

*Primary Examiner* — Serkan Akar
(74) *Attorney, Agent, or Firm* — Clayton, McKay & Bailey, PC

(57) ABSTRACT

A method includes receiving time-varying boundary condition values measured for a probe inside a cavity of an organ of a patient. A time-dependent shape of the probe is calculated by (a) representing sections of the probe as first springs, (b) representing external forces acting on the sections as second springs, and (c) solving a set of coupled equations of motion, for the first springs and the second springs, so as to meet the time-varying boundary condition values. The shape is presented to a user.

3 Claims, 3 Drawing Sheets

(51) Int. Cl.
*A61B 5/06* (2006.01)
*A61B 6/00* (2024.01)
*A61B 6/12* (2006.01)
*A61B 6/50* (2024.01)
*A61B 8/08* (2006.01)
*A61B 18/14* (2006.01)
*A61B 34/00* (2016.01)
*A61B 90/00* (2016.01)
*G01R 33/28* (2006.01)
*A61B 18/00* (2006.01)
*A61M 25/01* (2006.01)

(52) U.S. Cl.
CPC .......... *A61B 5/6852* (2013.01); *A61B 5/6869* (2013.01); *A61B 6/12* (2013.01); *A61B 6/486* (2013.01); *A61B 6/503* (2013.01); *A61B 8/0883* (2013.01); *A61B 18/1492* (2013.01); *G01R 33/285* (2013.01); *A61B 2018/00351* (2013.01); *A61B 2018/00577* (2013.01); *A61B 2034/2051* (2016.02); *A61B 2034/2061* (2016.02); *A61B 2034/254* (2016.02); *A61B 2090/065* (2016.02); *A61M 2025/0166* (2013.01)

(58) Field of Classification Search
CPC ........ A61B 2034/254; A61B 2090/065; A61B 2018/00351; A61B 2018/00577; G01R 33/285; A61M 2025/0166
See application file for complete search history.

(56) References Cited

U.S. PATENT DOCUMENTS

| | | | |
|---|---|---|---|
| 6,332,089 | B1 | 12/2001 | Acker et al. |
| 6,484,118 | B1 | 11/2002 | Govari |
| 6,618,612 | B1 | 9/2003 | Acker et al. |
| 6,690,963 | B2 | 2/2004 | Ben-Haim et al. |
| 7,850,456 | B2 | 12/2010 | Chosack et al. |
| 8,348,861 | B2 | 1/2013 | Glozman et al. |
| 8,478,379 | B2 | 7/2013 | Osadchy et al. |
| 8,671,817 | B1 | 3/2014 | Bogusky |
| 9,326,700 | B2 | 5/2016 | Govari et al. |
| 9,636,483 | B2 | 5/2017 | Hart et al. |
| 2002/0065455 | A1 | 5/2002 | Ben-Haim et al. |
| 2003/0120150 | A1 | 6/2003 | Govari |
| 2004/0068178 | A1 | 4/2004 | Govari |
| 2007/0100332 | A1 | 5/2007 | Paul et al. |
| 2008/0243063 | A1 | 10/2008 | Camarillo |
| 2009/0093806 | A1 | 4/2009 | Govari et al. |
| 2016/0349044 | A1 | 12/2016 | Marell et al. |
| 2017/0071671 | A1 | 3/2017 | Neumann et al. |
| 2018/0184884 | A1* | 7/2018 | Nakamura ......... A61B 1/00147 |
| 2019/0029761 | A1 | 1/2019 | Birkenbach et al. |
| 2020/0253669 | A1 | 8/2020 | Diolaiti et al. |
| 2020/0367719 | A1* | 11/2020 | Au ....................... A61B 1/0016 |

FOREIGN PATENT DOCUMENTS

| | | |
|---|---|---|
| CN | 106256310 A | 12/2016 |
| EP | 3669770 B1 | 6/2021 |
| WO | 1996/005768 A1 | 2/1996 |

OTHER PUBLICATIONS

Search Report from corresponding European Patent Application No. 19217851.5, dated Mar. 24, 2020.

Huang et al., Modeling and Simulation of Multi-frictional Interaction Between Guidewire and Vasculature, Advances in Databases Andinformation Systems, Aug. 4, 2015, pp. 524-637.

* cited by examiner

CATHETER POSITION TRACKING AND REPRESENTATION USING A DYNAMIC SPRING MODEL AND MOTION EQUATION

CROSS-REFERENCE TO RELATED APPLICATION

This application is a continuation application of U.S. application Ser. No. 16/228,385, filed Dec. 20, 2018, which is incorporated herein in its entirety by reference.

FIELD OF THE INVENTION

The present invention relates generally to invasive medical devices that are at least partially flexible, and particularly to cardiac probes.

BACKGROUND OF THE INVENTION

Modeling a shape of invasive medical probes, such as catheters, was proposed in patent literature. For example, U.S. Patent Application Publication 2008/0243063 describes a guide catheter that includes tension or deflection element such as a stainless-steel wire or pull wire. An actuator, such as a servo motor, is operably coupled to a controller. The controller is configured to control actuation of the servo motor based on execution of a control model including a mechanics model that accounts for a force on the guide instrument. The control model may also utilize both kinematics and mechanics models, where embodiments may be expressed with an analogy to a spring model including set of series springs, which gives rise to a conceptual manipulator or catheter. The controller is configured to control actuation of the actuator based the control model that includes the mechanics model such that the guide catheter bends when the actuator moves the deflection member.

As another example, U.S. Pat. No. 8,671,817 describes a braiding device for catheter having actuated varying pull-wires. The braider is for braiding wires to a tube comprising an iris assembly having stacked iris plates. Each of the iris plates includes a center aperture, a wire orifice disposed radially outward from the center aperture, and an arcuate channel. The braider comprises a feeder assembly configured for advancing the tube through the center apertures, and advancing the wires through the respective wire orifices. The braider further comprises a braiding assembly configured for braiding a plurality of filaments around the tube and the plurality of wires as they are fed through the iris assembly, thereby creating a braided tube assembly. A series spring model of the catheter is then used to compute the distal pull-wire distances that will produce a desired moment.

U.S. Pat. No. 8,478,379 describes a method for visualization of a probe that includes receiving an input indicative of respective apparent coordinates of a plurality of points disposed along a length of the probe inside a body of a subject, and applying a model of known mechanical properties of the probe to the apparent coordinates so as to compute a cost function with respect to shapes that can be assumed by the probe in the body. A shape is chosen responsively to the cost function, and corrected coordinates of the points along the length of the probe are generated based on the shape. The representation of the probe using the corrected coordinates is then displayed.

U.S. Pat. No. 7,850,456 describes a device system and method for simulating laparoscopic procedures, particularly for the purposes of instruction and/or demonstration. The system comprises one or more virtual organs to be operated on. The organ comprises a plurality of elements, each element having neighboring elements; and a plurality of tensioned connections connecting neighboring elements over said organ, such that force applied at one of said elements propagates via respective neighboring elements provides a distributed reaction over said organ. In addition, there is a physical manipulation device for manipulation by a user; and a tracking arrangement for tracking said physical manipulation device and translating motion of said physical manipulation device into application of forces onto said virtual organ. The system is capable of simulating organs moving, cutting, suturing, coagulations and other surgical and surgery-related operations.

U.S. Pat. No. 9,636,483 describes a robotic surgical system, configured for the articulation of a catheter, which comprises an input device, a control computer, and an instrument driver having at least one motor for displacing the pull-wire of a steerable catheter wherein the control computer is configured to determine the desired motor torque or tension of the pull-wire of a catheter based on user manipulation of the input device. The present embodiment further contemplates a robotic surgical method for the articulation of a steerable catheter wherein an input device is manipulated to communicate a desired catheter position to a control computer and motor torque commands are outputted to an instrument driver. The robotic system may further comprise a torque sensor.

SUMMARY OF THE INVENTION

An embodiment of the present invention that is described herein provides a method including receiving time-varying boundary condition values measured for a probe inside a cavity of an organ of a patient. A time-dependent shape of the probe is calculated by (a) representing sections of the probe as first springs, (b) representing external forces acting on the sections as second springs, and (c) solving a set of coupled equations of motion, for the first springs and the second springs, so as to meet the time-varying boundary condition values. The shape is presented to a user.

In some embodiments, presenting the shape to the user includes presenting the shape overlaid on an anatomical map of at least a portion of the cavity.

In an embodiment, the boundary condition values include measured positions of multiple points over the probe. In another embodiment, the boundary condition values include external forces applied to the probe at given intervals along the probe.

In some embodiments, solving the set of coupled equations of motion includes (i) dividing the probe into sections, (ii) providing a respective 1st order equation of motion for each section, and (iii) solving a resulting set of coupled 1st order equations of motion.

In some embodiments, the organ is the heart.

There is additionally provided, in accordance with an embodiment of the present invention, a system including an interface and a processor. The interface is configured to receive time-varying boundary condition values measured for a probe inside a cavity of an organ of a patient. The processor is configured to calculate a time-dependent shape of the probe, by (a) representing sections of the probe as first springs, (b) representing external forces acting on the sections as second springs, and (c) solving a set of coupled equations of motion, for the first springs and the second springs, so as to meet the time-varying boundary condition values. The processor is further configured to present the shape to a user.

The present invention will be more fully understood from the following detailed description of the embodiments thereof, taken together with the drawings in which:

DETAILED DESCRIPTION OF EMBODIMENTS

Overview

Figure 1:
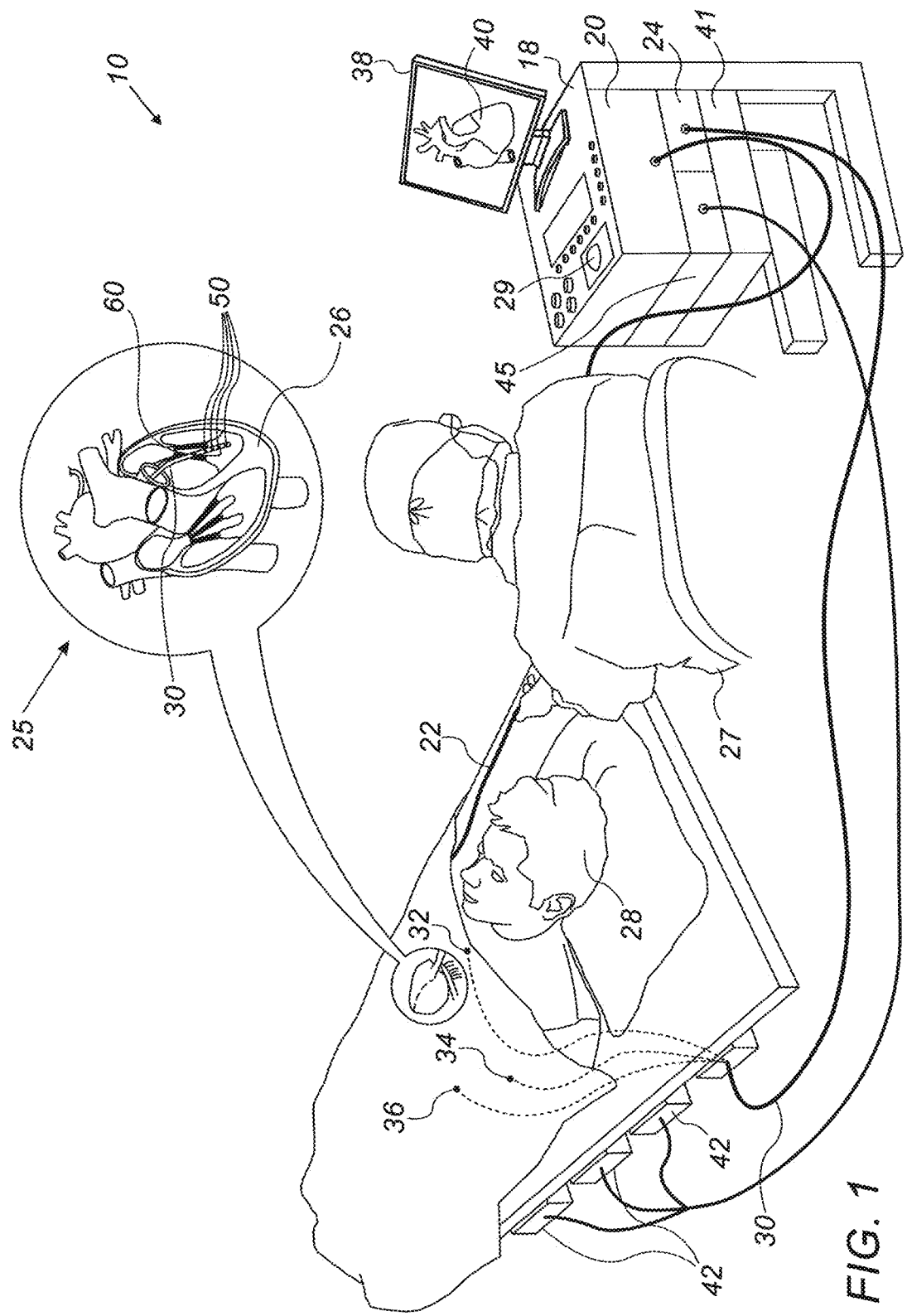
FIG. 1 is a schematic, pictorial illustration of a catheter-based position tracking system, in accordance with an embodiment of the present invention.

Embodiments of the present invention that are described hereinafter visualize an invasive probe inside a cavity of an organ, such as a cardiac catheter inside a heart, based on modeling the mechanical properties of the probe. The disclosed technique visualizes and presents the shape of the probe to a user as it changes in time due to the medical procedure and the motion of the beating heart. To calculate a changing shape, including viscous (i.e., damping) effects, the disclosed method applies a computationally efficient $1^{st}$ order dynamic mass spring model (named hereinafter "DMS model"), which a processor solves using boundary conditions that change as a function of time.

The disclosed DMS model of the probe comprises a set of $1^{st}$ order dynamic coupled differential equations, described below, which represent the probe as a "chain" of coupled elastic sections (i.e., first springs). Such a chain can faithfully describe a changing curved shape of an elastic distal end of the probe located inside, for example, a moving heart, where, typically, there is always some motion of the distal end.

To derive the DMS model, an underlying assumption is that external forces applied on the distal end can be described by external elastic elements (i.e., second springs) having a vector spring constant. Mathematically, this assumption reduces a set of $2^{nd}$ order differential equations (e.g., Newton Equations) into the disclosed simplified model, as described below.

Using the DMS model, the processor can determine the shape of the distal end by solving the coupled equations, so as to find, at any given time, the shapes of all the sections of which the distal end is made.

When the distal end of the probe is in a static region of an organ, the movement of the coupled elastic sections eventually converge to a minimum energy state (i.e., to a mechanical equilibrium in which motion diminishes after all forces are balanced).

In some embodiments, the DMS model uses, as a boundary condition, a vector of positions measured by position sensors disposed over the distal end. In other embodiments, the DMS model uses, as a boundary condition, a vector of forces measured by contact force sensors disposed over the distal end. In general, the DMS model may utilize any set of measured quantities that can be used for solving a dynamic model including, for example, measured accelerations, a combination of measured forces, and at least one measured position.

When the boundary conditions comprise external forces, the DMS model may model the forces as springs acting on the distal end at given intervals along the distal end (i.e., at locations where the contact force sensors measure the external forces). At least one measured position of the probe is also used to provide a reference position for the shape. External forces acting on the distal end are applied, for example, by a pulsating lumen, or a heart chamber surrounding the distal end. Viscosity, such as from distal end motion in blood, acts to damp the motion of the distal end. Because of the motion of the heart, the external and internal forces typically change, as reflected by the time-dependent boundary conditions.

As the DMS model is run over time, the modeled springs are allowed to act on their respective sections of the so that these sections move and relax. The computations involved in solving these types of equations are significantly easier than performing computations using other techniques, such as deriving a shape that minimizes the total energy of the probe.

Typically, the processor is programmed in software containing a particular algorithm that enables the processor to conduct each of the processor related steps and functions outlined above.

By being computationally easier to realize, the disclosed technique for modeling a shape of a probe inside a patient body in real time may allow broader deployment of diagnostic catheter-based systems, as well as of other invasive devices, that may utilize the disclosed method.

SYSTEM DESCRIPTION

FIG. 1 is a schematic, pictorial illustration of a catheter-based position tracking system 10, in accordance with an embodiment of the present invention. System 10 is used in determining the position of a flexible probe 22, such as a catheter, which is inserted into a cavity of an organ of a patient 28, such as a chamber of a heart 26. Typically, probe 22 is used for diagnostic or therapeutic treatment, such as mapping electrical potentials in heart 26 or performing ablation of heart tissue. A distal end 30 of probe 22, shown in inset 25 inside heart 26, comprises one or more sensing electrodes 50. These electrodes are connected by wires (not shown) through probe 22 to driver circuitry 20 in a console 18, as described below. Electrical interface circuitry 24 enables console 18 to interact with probe 22, for example, to receive position-indicative signals from sensing electrodes 50.

Electrical interface circuitry 24 in console 18 is connected by wires through a cable 30 to body surface electrodes, which typically comprise adhesive skin patches 32, 34, and 36. Patches 32, 34, and 36 may be placed at any convenient locations on the body surface in the vicinity of distal end 32. For example, for cardiac applications, patches 32, 34, and 36 are typically placed around the chest of patient 28. A physician 27 controls the operation of console 18 via a group of input devices 29.

In some embodiments, a processor 41 in console 18 determines position coordinates of sensing electrodes 50 inside heart 26 based on the impedance measured between probe 22 and patches 32, 34, and 36 (i.e., based on the position indicative signals generated by sensing electrodes 50). Using real-time derived positions of electrodes 50 as a real-time boundary condition for the disclosed dynamic mass-spring model, processor 41 determines a changing (i.e., time-dependent) shape of distal end 30 inside beating heart 26.

In an embodiment, console 18 further comprises a magnetic-sensing sub-system. Patient 28 is placed in a magnetic field generated by a pad containing magnetic field generator coils 42, which are driven by a unit 45. The magnetic fields generated by coils 42 generate position signals in a magnetic sensor 60, seen in inset 25, which are further provided as corresponding electrical inputs to processor 41, which uses the magnetic position signals for calculating a reference location of distal end 30, as described below.

Methods and systems for magmatic tracking are described in U.S. Pat. Nos. 5,391,199, 6,690,963, 6,484,118, 6,239,724, 6,618,612 and 6,332,089, in PCT International Publication WO 1996/005768, and in U.S. Patent Application Publications 2002/0065455 A1, 2003/0120150 A1 and 2004/0068178 A1, whose disclosures are all incorporated herein by reference. Additionally or alternatively, any other suitable technique can be used.

Console 18 drives a display 38, which shows the position of distal end 30 inside heart 26. Probe 22 may be used in generating a map 40 of the heart. The position of distal end 30 may be superimposed on map 40 or on another image of the heart.

Processor 41 is typically a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory. In particular, processor 41 runs a dedicated algorithm as disclosed herein, including in FIG. 4, which enables processor 41 to perform the disclosed steps, as described below.

In an alternative embodiment, contact force sensors (shown in FIG. 2B) are used additionally or alternatively to electrode 50 to sense forces acted on distal end 30, which processor 41 uses as a real-time boundary condition for solving the disclosed dynamic mass-spring model, in order to determine a changing shape of distal end 30 inside beating heart 26. In an embodiment, a single position sensor is available to give a location of distal end 30. The known distances between the contact force sensors, and between contact sensors and the position sensor, are sufficient for processor 41 to determine the time-dependent shape and position of distal end 30.

Catheter Representation Using a Dynamic Spring Model

Figure 2A:
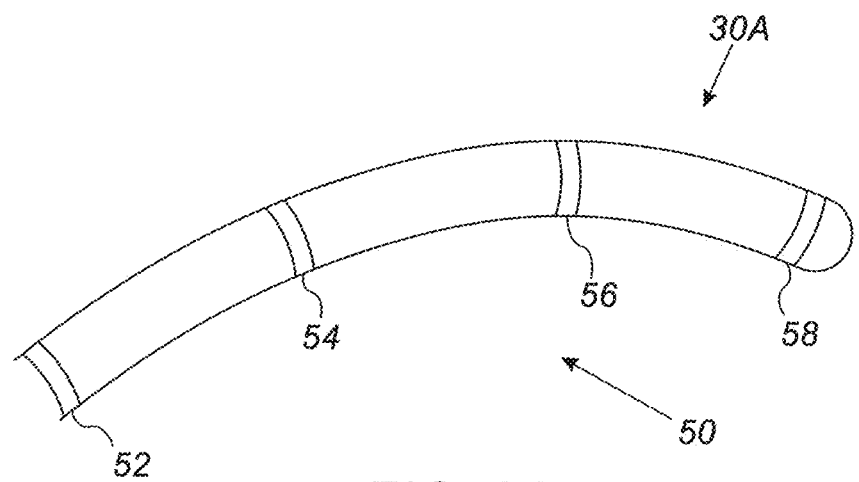
FIGS. 2A and 2B are schematic, side-views of distal ends of catheters deviating from their free shape, in accordance with embodiments of the present invention.
Figure 2B:
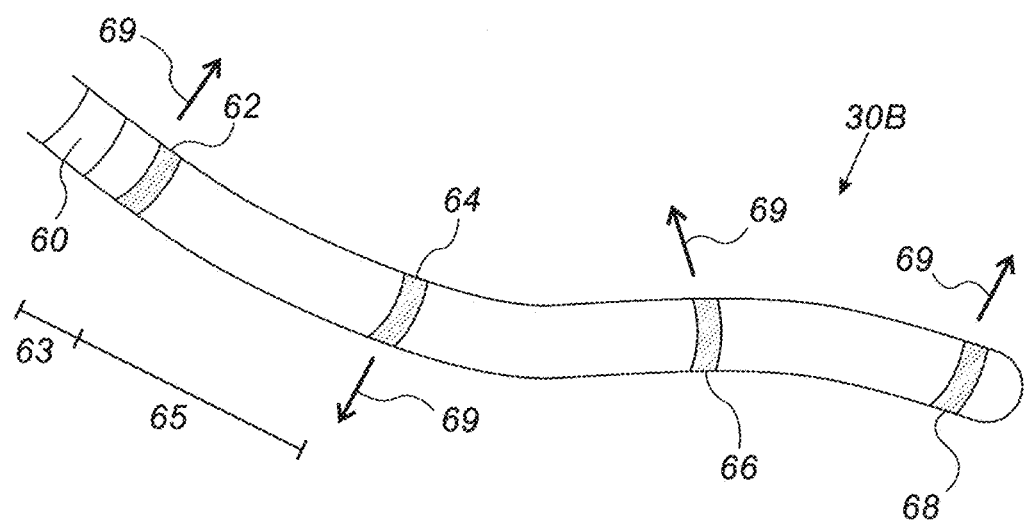

FIGS. 2A and 2B are schematic, side-views of a distal end of a catheter deviating from its free shape, in accordance with embodiments of the present invention.

FIG. 2A shows a representation of an actual curvature of a distal end 30A of a catheter in heart 26, wherein distal end 30A comprises electrodes 52, 54, 56, and 58, collectively named above "electrodes 50," which serve as position sensors in this embodiment.

FIG. 2B shows a representation of an actual curvature a distal end 30B of a catheter in heart 26, wherein distal end 30B comprises (i) magnetic position sensor 60, and (ii) contact force sensors 62, 64, 66, and 68. The contact force sensors are separated from each other by known lengths 65 along distal end 30. Position sensor 60 and contact force 62 are separated by a length 63 along distal end 30. Arrows 69 illustrate external forces applied on distal end 30, causing the distal end to curve. In an embodiment, the contact-force indicative signals are sensed by sensors 62, 64, 66, and 68.

U.S. Patent Application Publications 2007/0100332 and 2009/0093806, whose disclosures are incorporated herein by reference, describe methods of sensing contact force between a distal end of a catheter and tissue in a body cavity using a force sensor embedded in the catheter. Additionally or alternatively, any other suitable technique can be used.

The illustration in FIG. 2 is brought by way of example. Other configuration, which, for example, include multiple magnetic position sensors disposed along distal end 30, are possible.

Figure 3A:
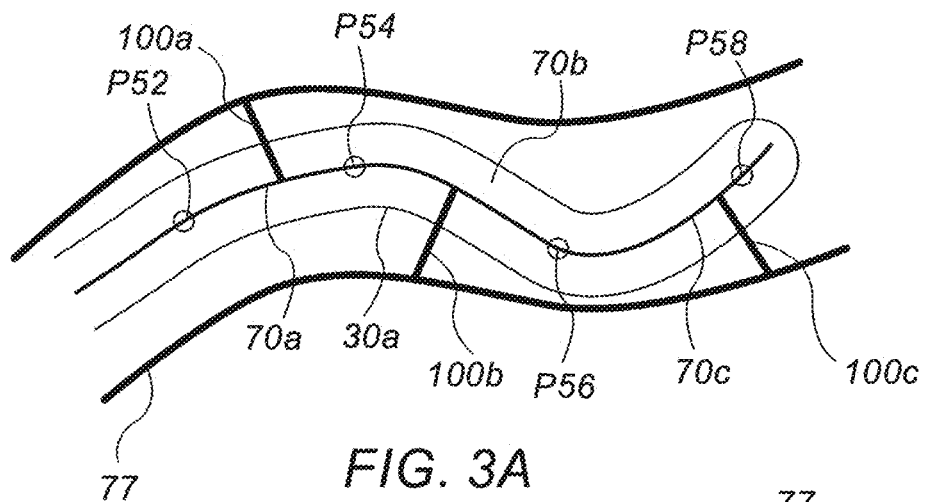
FIGS. 3A and 3B are schematic, side-view illustrations of boundary conditions applied to a spring model of the distal ends of FIGS. 2A and 2B, respectively, in accordance with embodiments of the present invention.
Figure 3B:
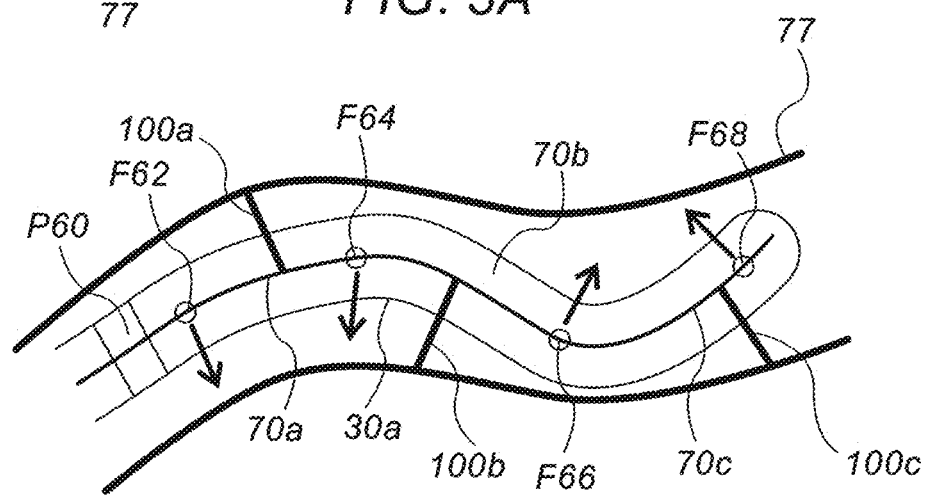

FIGS. 3A and 3B are schematic, side-view illustrations of boundary conditions applied to a spring model of the distal ends of FIGS. 2A and 2B, respectively, in accordance with embodiments of the present invention.

As seen in FIGS. 3A and 3B, the disclosed DMS model divides distal end 30 into elastic sections 70a, 70b, and 70c, wherein in general a distal end can be modeled by a number N of elastic sections 70. Each section 70 is modeled as a spring having vector spring constant k and damping coefficient γ (e.g., along three mutually orthogonal directions of space).

The dynamic deformable properties of distal end 30 can therefore be modeled using a matrix representation for the entire "chain" consisting of coupled elastic sections, with a set of $2^{nd}$ order equations governing the motion of each elastic section being:

$$m\ddot{r}_i = k \cdot (r_i - r_{0i}) - \gamma \cdot \dot{r}_i + k^T \varepsilon_{ij}(r_j - r_i), \qquad \text{Eq. 1}$$

where m is the mass of the i"th section and $r_{0i}$ is the rest position of the i"th section, and $k^T$ is the vector transpose of k. $\varepsilon_{ij}$ is a given elastic coupling coefficient between neighboring sections {i, j}, i, j=1, 2, ... N, which models elastic forces that neighboring sections apply on the i"th section, where $\varepsilon_{ij}$ is given by:

$$\varepsilon_{ij} = (1 - l_0/\|(r_j - r_i)\|), \qquad \text{Eq. 2}$$

where $l_0$ is the inter section distance in a resting position. The elastic forces resist curving and/or stretching/contracting of adjacent sections one with respect to the other. Modeling of forces exerted on a catheter using a $2^{nd}$ order mass spring model is suggested, for example, by Tuan et al., in "A hybrid contact model for cannulation simulation of ERCP," Studies in health technology and informatics, 196, April 2014, pages 304-306.

The disclosed technique assumes that external forces applied on distal end 30, for example from a pulsating lumen 77, can be described as external elastic elements 100a, 100b and 100c, having a vector spring constant K. In general a distal end can be modeled by a number N of elastic sections 100 and therefore distal end 30 motion is governed by $$m\ddot{r}_i = K \cdot (r_i - r_{0i}) \qquad \text{Eq. 3}$$

Combining Equations 1 and 3, yields a set of $1^{st}$ order equations, which is the disclosed DMS model:

$$0 = (K - k) \cdot (r_i - r_{0i}) - \gamma \cdot \dot{r}_i + k^T \varepsilon_{ij}(r_j - r_i) \qquad \text{Eq. 4}$$

FIG. 3A shows a DMS-calculated geometrical model of distal end 30A. The required boundary condition for the matrix equation is provided as a vector of locations P52, P54, P56, and P58 of sensing electrodes 52, 54, 56 and 58, respectively, as measured based on the signals received by console 18.

FIG. 3B shows a DMS-calculated geometrical model of distal end 30B. The required boundary condition for the matrix equation is provided as a vector of forces F62, F64, F66, and F68 of contact-force sensors 62, 64, 66, and 68, respectively, as measured based on signals received by console 18. The shape of distal end 30B is then calculated relative to a reference location 60P provided by position sensor 60.

Figure 4:
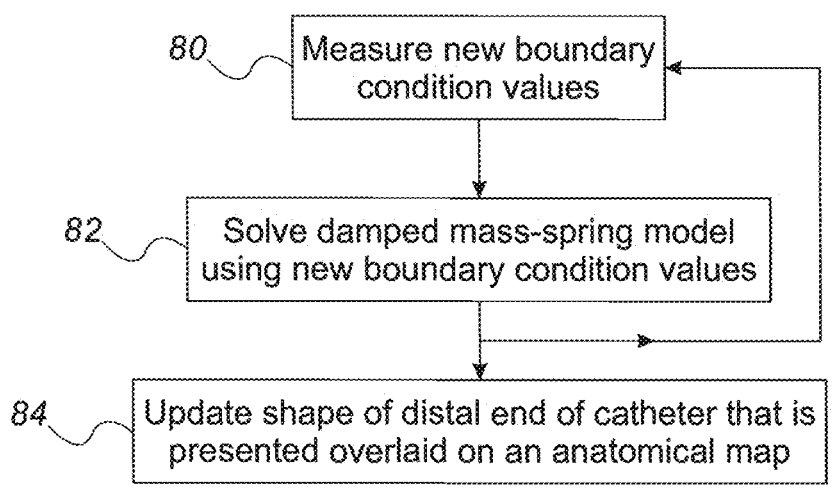
FIG. 4 is a flow chart that schematically illustrates a method and algorithm for calculating a shape of one of the distal ends of FIGS. 2A and 2B, in accordance with an embodiment of the present invention.

FIG. 4 is a flow chart that schematically illustrates a method and algorithm for calculating a shape of one of the distal ends of FIGS. 2A and 2B, in accordance with an embodiment of the present invention, drives a process that begins with processor 41 receiving, in real time, newly measured boundary condition values, at a receiving boundary conditions step 80, to be used for calculating a shape of distal end 30. Distal end 30 is located inside beating heart 26, hence, as described above, the new values reflect a "snap-shot" of the catheter shape. The new values may be positions, forces, or a combination thereof. Next, processor 41 solves the disclosed DMS model using the received boundary conditions, to obtain an instantaneous shape of distal end 30 inside heart 26, at a shape modeling step 82. Finally, processor 41 updates the presented shape, e.g., to physician 27 via display 40, e.g., overlaid on an anatomical map of at least portion of heart 26, at a catheter shape presentation step 84. The processor is then ready to receive a new set of boundary conditions, and the process loops back to step 80.

The example algorithm shown in FIG. 4 is chosen purely for the sake of conceptual clarity. The present invention also comprises additional steps of the algorithm, such as presenting an estimated type of arrhythmic pattern that causes an image to be filtered out of the series, which have been omitted from the disclosure herein purposely in order to provide a more simplified flow chart.

Although the embodiments described herein mainly address cardiac probes, the methods and systems described herein can also be used in other medical devices that are inserted into a cavity of an organ of a patient.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A catheter-based position tracking system, comprising;
an interface, which is configured to receive time-varying boundary condition values measured for a catheter inside a cavity of an organ of a patient by receiving at least one of position indicative signals or contact-force indicative signals sensed by contact force sensors located along the length of the catheter, the time-varying boundary condition values comprising positions of multiple points corresponding to positions of sensors along a length of the catheter; and
a processor, configured to:
calculate a time-dependent shape of multiple adjacent elastic sections of the catheter at each sensor position, respectively, using the time-varying boundary condition values, by:
representing adjacent elastic sections of the catheter as a set of first springs, the adjacent elastic sections representing the catheter as a chain of first springs, wherein motion of each of the first springs is governed by a first equation of motion;
representing external forces acting on the adjacent elastic sections as a set of second springs, wherein motion of each of the second springs in response to the corresponding external force is governed by a second equation of motion; and
solving a set of equations of motion corresponding to each of the multiple adjacent elastic sections, respectively, so as to meet the time-varying boundary condition values, each equation of the set of equations being derived by combining the first equation of motion for the first springs and the second equation of motion for the second springs; and
present the calculated time-dependent shape of the catheter to a user; and
a display configured to show the positions of multiple points of the catheter.

2. The system according to claim 1, wherein the processor is configured to present the shape of the probe to the user by overlaying the shape on an anatomical map of at least a portion of the cavity.

3. The system according to claim 1, wherein the organ is the heart.

* * * * *